United States Patent
Edgeworth

(10) Patent No.: US 8,707,981 B2
(45) Date of Patent: Apr. 29, 2014

(54) SYSTEM FOR INCREASING THE EFFICIENCY OF A WATER METER

(75) Inventor: Richard Edgeworth, Tampa, FL (US)

(73) Assignee: Flow Dynamics, LLC, Encinitas, CA (US)

( * ) Notice: Subject to any disclaimer, the term of this patent is extended or adjusted under 35 U.S.C. 154(b) by 282 days.

(21) Appl. No.: 12/946,897

(22) Filed: Nov. 16, 2010

(65) Prior Publication Data

US 2012/0118406 A1    May 17, 2012

(51) Int. Cl.
*F16K 15/06* (2006.01)
*F16K 27/02* (2006.01)

(52) U.S. Cl.
USPC .......................... 137/270; 137/542; 251/337

(58) Field of Classification Search
USPC ................. 137/535, 540, 542, 270; 251/337; 73/861.82
See application file for complete search history.

(56) References Cited

U.S. PATENT DOCUMENTS

| | | | | |
|---|---|---|---|---|
| 678,565 | A * | 7/1901 | Herbst | 415/149.1 |
| 967,514 | A * | 8/1910 | Groh | 137/515.5 |
| 1,785,271 | A * | 12/1930 | Lemex | 137/515.5 |
| 2,301,276 | A * | 11/1942 | Gussick | 137/542 |
| 2,594,641 | A * | 4/1952 | Griffith et al. | 137/543 |
| 2,870,784 | A * | 1/1959 | Walls | 137/543 |
| 3,405,927 | A * | 10/1968 | Drabik et al. | 267/175 |
| 3,422,840 | A * | 1/1969 | Brumm et al. | 137/384 |
| 3,434,495 | A * | 3/1969 | Scaramucci | 137/542 |
| 3,747,629 | A * | 7/1973 | Bauman | 137/270 |
| 3,938,542 | A * | 2/1976 | Bolha | 137/271 |
| 4,535,808 | A * | 8/1985 | Johanson et al. | 137/543 |
| 4,757,974 | A * | 7/1988 | Ward et al. | 251/356 |
| 5,349,984 | A * | 9/1994 | Weinheimer et al. | 137/543.21 |
| 5,379,835 | A * | 1/1995 | Streich | 166/181 |
| 6,866,062 | B2 * | 3/2005 | Lammers | 137/543 |
| 2009/0007973 | A1 * | 1/2009 | Benvenuto | 137/505 |
| 2009/0289207 | A1 | 11/2009 | Barreda et al. | |

* cited by examiner

*Primary Examiner* — John Rivell
(74) *Attorney, Agent, or Firm* — GrayRobinson, P.A.; Michael J. Colitz, III

(57) ABSTRACT

Disclosed is a system and an associated valve assembly that are adapted to increase the efficiency of an upstream water meter. By way of the valve assembly entrained water bubbles can be removed from a water supply. This, in turn, increases the density of the water running through the water meter. This ensures that the water meter is not inaccurately including entrained air as metered water. The result is more accurate water readings and reduced utility bills.

6 Claims, 7 Drawing Sheets

SYSTEM FOR INCREASING THE EFFICIENCY OF A WATER METER

BACKGROUND OF THE INVENTION

1. Field of the Invention

This invention relates to a water valve. More specifically, the present invention relates to a valve assembly and an associated system for increasing water density and improving the accuracy of a water meter.

2. Description of the Background Art

The use of airflow regulating assembly is known in the art. For example, U.S. Pat. App. 2009/0289207 to Barreda discloses a valve assembly that is adapted to be disposed within a water supply line. The valve assembly is structured to reduce or significantly eliminate the passage of air, separate from water flow, through the meter. The valve body includes a sealing structure which is biased under a predetermined force into sealing relation with an inlet of the interior channel. The predetermined force is sufficient to prevent displacement of the sealing structure out of the sealing relation with the inlet, but insufficient to prevent displacement of the sealing structure when force from a normal water flow is exerted thereon. As a result, any air flow within the water supply line will be compressed or otherwise disbursed and prevented from passing, independently, through the meter, thereby preventing unnecessary charges being made to the metered facility.

Although the device of Barreda is sufficient to achieve its stated objective, it is lacking in many respects. The valve assembly of Barreda is needlessly complex with an excess number of moving parts. Moreover, the number of interconnected moving parts requires the device to be lubricated. This lubrication can result in the contamination of the associated drinking water. The system of Mauricio is also problematic insomuch as its valve assembly must be installed upstream of the meter assembly. Retrofitting a valve assembly upstream of a water meter poses several logical, legal, and safety related issues. The system of the present invention is aimed at overcoming these and other shortcomings of the Mauricio device.

SUMMARY OF THE INVENTION

It is therefore an object of the present invention to provide a system for increasing the density of water running through a meter to thereby increase the accuracy of the meter.

It is another object of the present invention to compress the air into the water as it is being metered.

A further object of the present invention is to provide a valve assembly for increasing the efficiency of an upstream water meter.

Still yet another object of the present invention is to provide a valve assembly that is constructed from self-lubricating polymers to thereby reduce wear ten-fold and avoid the need for external lubricants.

Yet another object of the present invention is to provide a valve construction that eliminates turbulence within water passing there through.

A further object of the present invention is to provide an improved valve construction with a minimal number of moving parts to thereby increase the life cycle of the valve and eliminate the need for repair and maintenance.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a system and an associated valve assembly that are adapted to increase the efficiency of an upstream water meter. By way of the valve assembly entrained water bubbles can be removed from a water supply. This, in turn, increases the density of the water running through the water meter. This ensures that the water meter is not inaccurately including entrained air as metered water. The result is more accurate water readings and reduced utility bills. The various components of the present invention and the manner in which they interrelate will be described in greater detail hereinafter.

Figure 1:
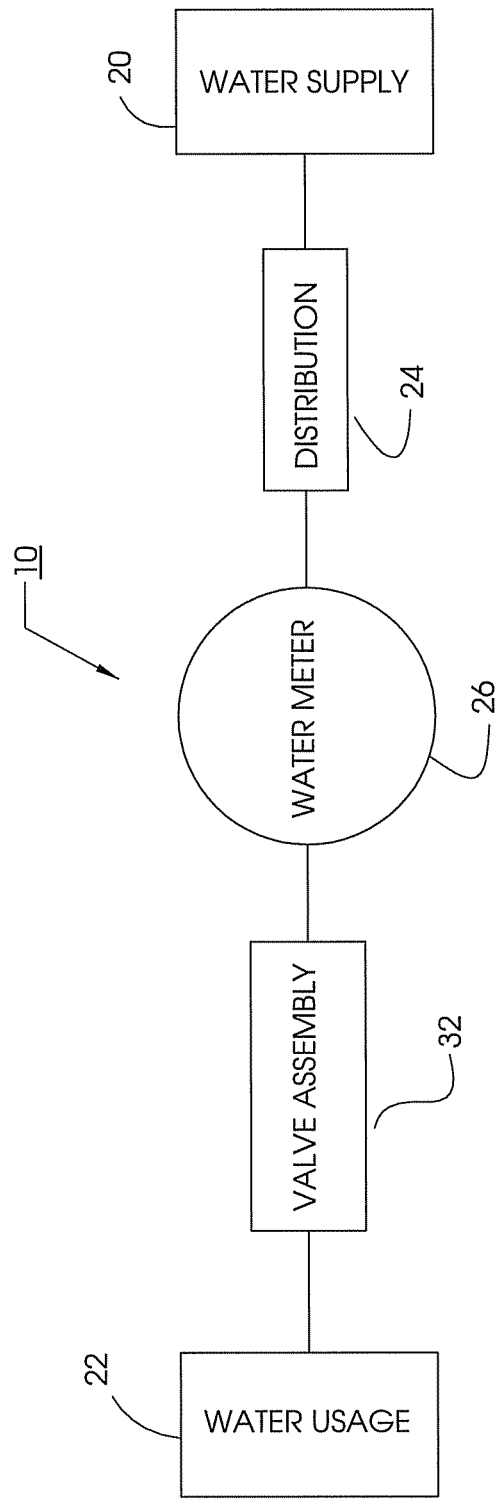
FIG. 1 is a diagram illustrating the system of the present invention.

FIG. 1 is a diagram illustrating the system 10 of the present invention. This system includes five primary components. The first component is a water supply 20. The water supply 20 can be, for example, the water supply or reservoir maintained by a utility or municipality. The reservoir may store a large volume of preferably portable water for distribution to a number of consumers. These various water consumers 22 may be, for example, dwellings such as houses or office buildings but may also include individual water fountains or other water outlets that are accessed by individuals. The second element in the system is a distribution network 24. This distribution network 24 may take the form of a number of water supplies and/or return lines that are interconnected to the water supply reservoir. This distribution network interconnects the plurality of water consumers 22. For the purpose of a frame of reference, the water supply 20 is upstream from the downstream distribution network 24.

The system 10 further includes a water meter 26 that is interconnected and in line with the distribution network 24 upstream from an individual water consumer 22. The water meter 26 may be of a conventional construction such as a float meter, multi-jet meter, turbine meter or positive displacement meter. Those of ordinary skill in the art will recognize other types of water meters that can be used in conjunction with the present invention. The water meter 26 is typically maintained by the utility or municipality and is operable to measure the volume of water used by the individual consumer over a pre-determined period of time. As such, the water meter 26 is instrumental in determining an individual user's water bill.

The present invention further includes a valve assembly 32 that is positioned downstream of the water meter 26 and is intermediate to the water meter 26 and the intake to a particular water consumer 22. As will be described in greater detail hereinafter, the valve assembly 32 includes a spring biased plunger that is triggered at a predetermined water pressure. Namely, water is permitted to pass into the individual user's dwelling only after a build-up of a sufficient water pressure. This has the effect of driving out any entrained water and increasing the water density through the meter 26. This, in turn, increases the efficiency of the water meter 26 and ensures that the consumer is paying only for the water they use as opposed to water and entrained air. Water meters measure volume. Water has air and water has more mass than air. When presented with pressure, water displaces the air and shrinks the air molecules, thereby creating more water mass.

The specifics of the valve assembly 32 are described in conjunction with FIGS. 2 through 7. These figures illustrate a cylindrical valve housing 34 having a forward valve inlet 36 and a rearward valve outlet 38. This valve housing 34 is preferably constructed from a self-lubricating polymer such as Vesconite™ as well as Delrin™. The valve housing 34 further includes a tapered valve seat 42 that is positioned adjacent to inlet 36. As described in greater detail hereinafter, closure mechanisms are secured adjacent the rearward valve outlet 38. In this regard first and second cylindrical recesses (44 and 46) are formed within the interior wall of the valve housing 34 immediately adjacent the outlet 38.

Figure 2:
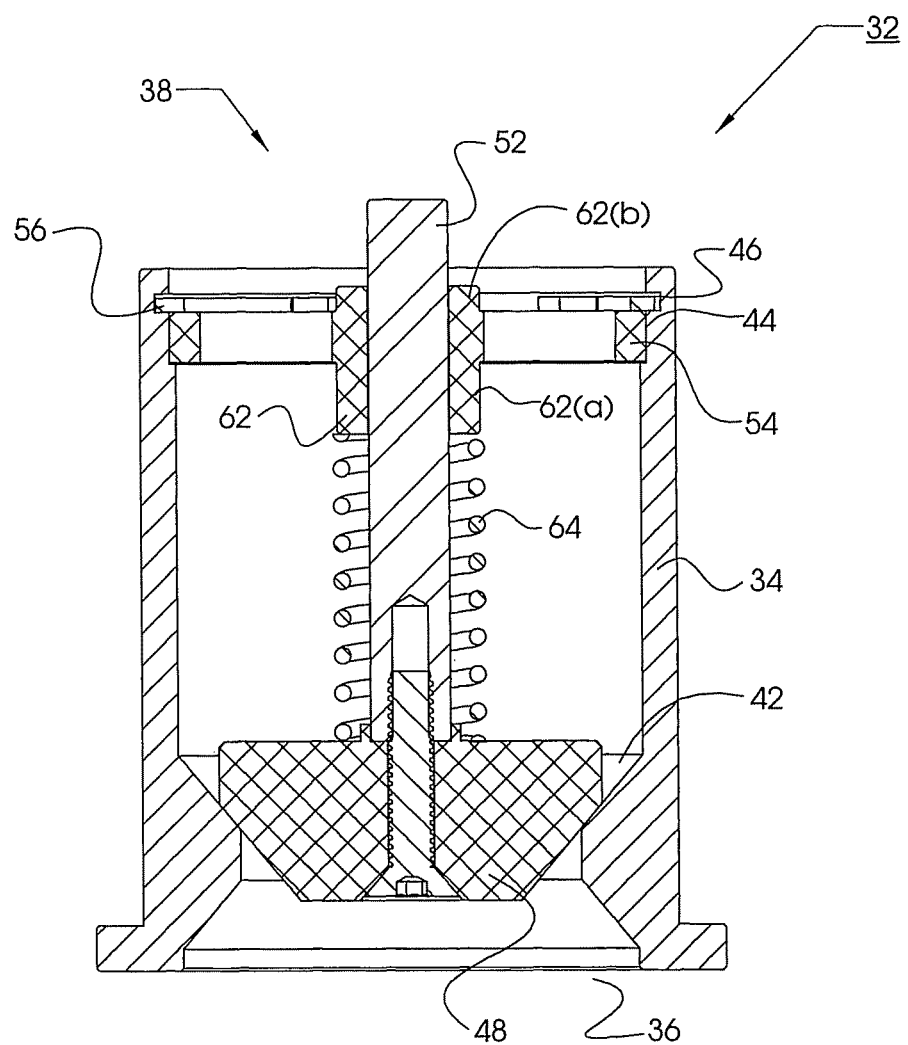
FIG. 2 is a cross-sectional view of the valve assembly of the present invention.

The valve 32 can be opened and closed by way of a valve disc 48. Again, this valve disc 48 is preferably formed from a self-lubricating polymer which may be the same polymer used for the cylindrical valve housing 34. The valve disc 48 includes a tapered extent and is generally in the shape of a frustro cone. As illustrated in FIG. 2, the taper of the valve seat 42 approximately matches the taper of the valve disc 48 so that the two can be placed in a fluid tight seal. The use of self-lubricating polymers eliminates the need for any gasket or sealing rings. As such, the valve disc 48 includes a seated orientation where it is in positive and sealing contact with the valve seat 42 to prevent the flow of water therethrough. The valve disc 48 also includes an unseated orientation wherein it is spaced a distance from the valve seat 42. The unseated orientation is generally done against the bias of a spring.

With continuing reference to FIG. 2, the valve shaft 52 is depicted. The valve shaft is generally defined with a forward end, a rearward end and an intermediate extent therebetween. The forward extent of the valve shaft includes a female threaded extent which is adapted to receive a threaded fastener, or fitted with a flange appropriately sized for the serving meter. Additionally the valve disc 48 includes a centrally located threaded passage. In this manner a threaded or flanged fastener can be used to secure the valve disc 48 to the forward end of the valve shaft 52. This threaded or flanged interconnection permits the valve disc 48 to be removed if needed.

Figure 3:
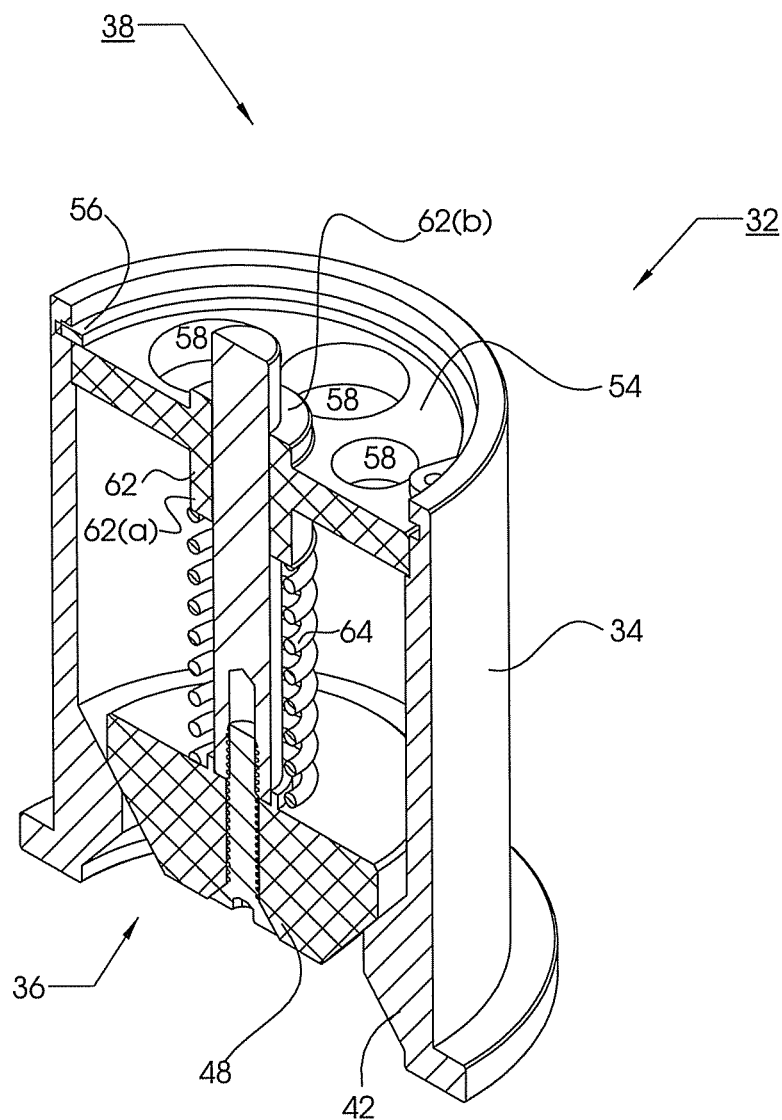
FIG. 3 is a perspective cross sectional view of the valve assembly of the present invention.
Figure 4:
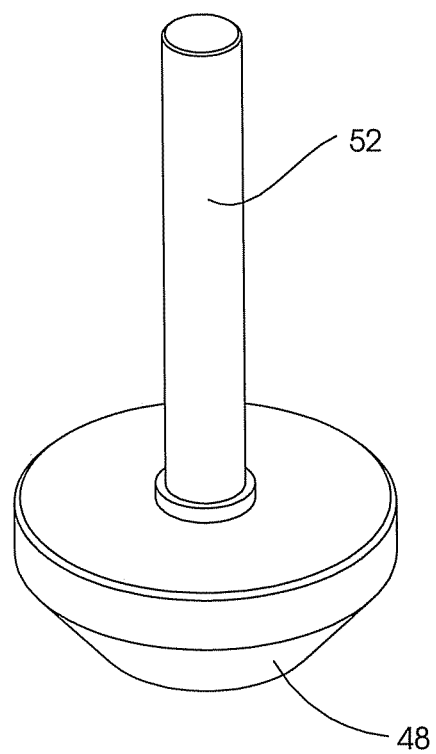
FIG. 4 is a detailed view of the valve stem and valve disc of the present invention.
Figure 5:
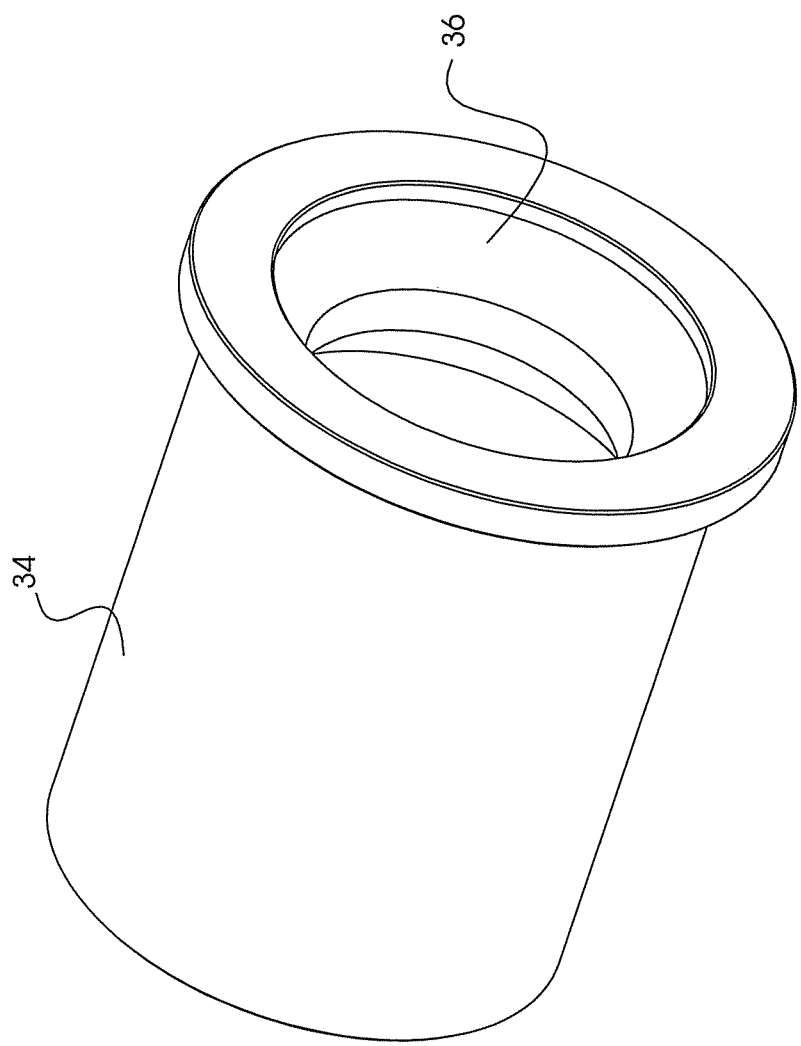
FIG. 5 is a perspective view of the valve housing of the present invention.
Figure 6:
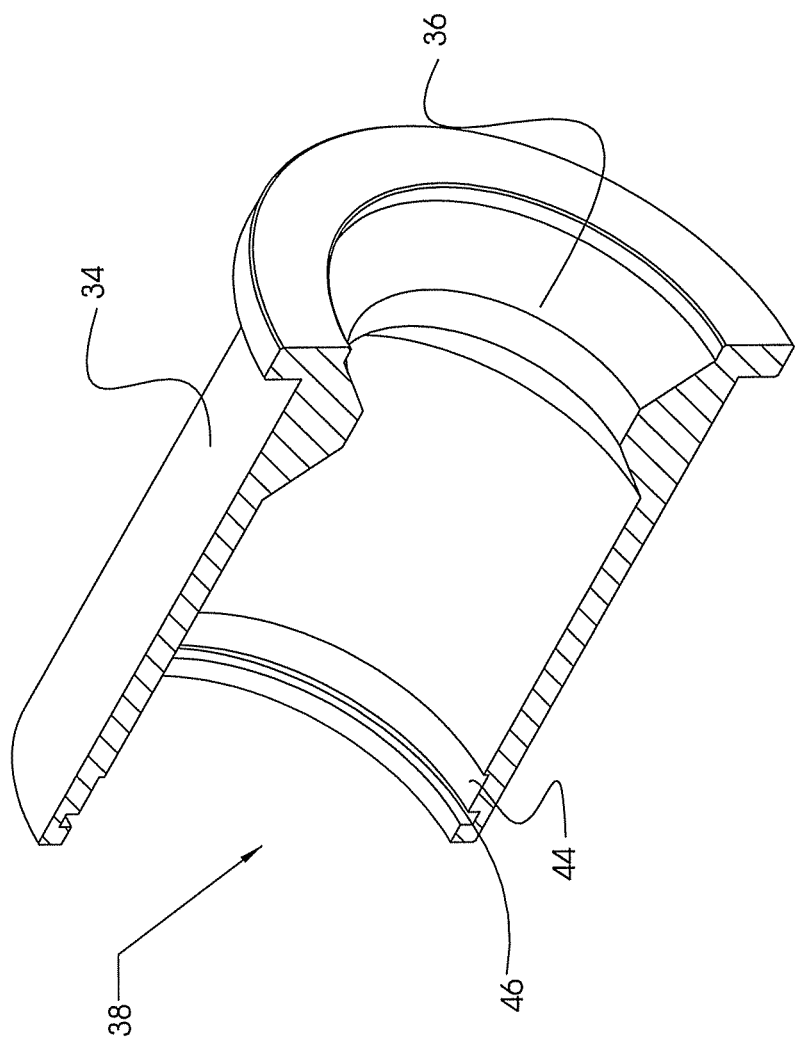
FIG. 6 is a perspective cross sectional view of the valve housing of the present invention.
Figure 7:
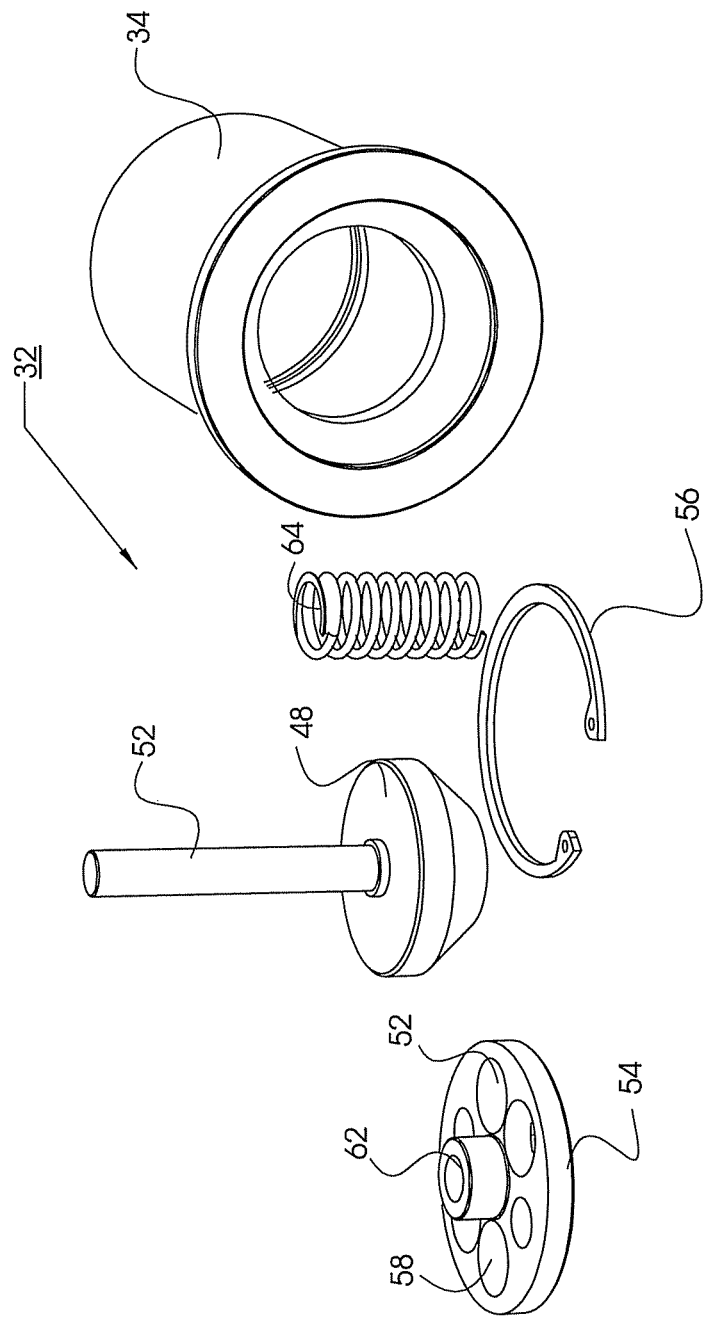
FIG. 7 is a disassembled view of the components of the valve assembly of the present invention.

The rear end of the valve assembly 34 includes a retainer 54 and a locking ring 56. The retainer 54 is generally disc shaped and fits within the first recess 44 of the valve housing. As illustrated in FIG. 7, the retainer 54 includes a number of circular openings 58. The collective cross section of these circular openings 58 is selected to match the diameter of the intake 36. As such, these cylindrical openings 58 permit water flowing through the intake 36 to be adequately routed through the outlet 38 of the valve. With reference to FIGS. 2 and 3, the shoulder 62 of the retainer 54 is illustrated. This retainer 62 includes a central axial passage as well as opposing first and second ends ($62(a)$ and $62(b)$). As noted in FIG. 2, the first end $62(a)$ of the shoulder 62 is substantially longer than the second end $62(b)$. The axial opening within the shoulder is adapted to slideably receive the valve shaft 52 and guide it as it reciprocates back and forth. A locking ring 56 is then used to secure the retainer 54. The locking ring 56 can be a spring biased ring with a break along its periphery such that it can be placed within the second recess 46 in a compressed orientation.

A coil spring 64 is positioned above the intermediate extent of the valve shaft 52. The coil spring 64 has a first end which is in contact with one of the shoulders ($62(a)$ or $62(b)$) of the retainer 54 and a second end which is in contact with the valve disc 48. As such, the coil spring 64 acts to bias the valve disc 48 into a seated orientation. However, the tension within the spring 64 can be changed by selecting which of the two shoulders ($62(a)$ or $62(b)$) is in contact with the end of the spring 64. Namely, if a tight spring tension is required, the first shoulder $62(a)$ can be placed in contact with the spring 64 as noted in FIG. 2. Alternatively, if a lesser spring tension is required, the retainer 54 can be removed turned around such that the shorter shoulder $62(b)$ is in contact with the spring.

With this arrangement, water contacting the valve disc 48 will be prevented from flowing through the valve 34 unless it exceeds a predetermined threshold pressure as dictated by the spring tension. Once this threshold water pressure is achieved the valve 48 will unseat and water will pass through the valve 34. It is envisioned that the water will repetitively exceed and not exceed this threshold water pressure. This will cause the valve disc 48 to repetitively open and close. This, in turn, results in the water upstream from the valve from becoming more dense and driving out any entrained air.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A valve assembly having an inlet and an outlet, the valve assembly adapted to increase the accuracy of an upstream water meter, the valve assembly comprising:

a cylindrical valve housing, the valve housing have a forward valve inlet and a rearward valve outlet, a tapered valve seat positioned adjacent the valve inlet, first and second cylindrical recesses positioned adjacent the valve outlet;

a valve disc positioned within the valve housing, the disc being tapered along its length, wherein the taper of the valve seat matches the taper of the valve disc, the valve disc having a seated orientation wherein it is in contact with the valve seat and an unseated orientation wherein the valve disc is spaced from the valve seat;

a valve shaft having a forward end, a rearward end, and an intermediate extent therebetween, a threaded fastener securing the valve disc to the forward end of the valve shaft;

a retainer secured within the first recess of the valve housing, the retainer including a series of circular apertures to permit the flow of fluid through the valve outlet, the retainer further including opposing shoulders of varying height, the opposing shoulders extending perpendicularly from a surface of the retainer and having an axial passage, the valve shaft slidably positioned within the axial passage;

a locking ring secured within the second recess of the valve housing and operable to lock the retainer within the valve housing;

a coil spring positioned about the intermediate extent of the valve shaft, the coil spring having a first end in contact with one of the two opposing shoulders of the retainer, a second end of the coil spring contacting the valve disc, whereby the spring tension is varied depending upon which of the two shoulders the coil spring contacts;

whereby water flowing from the inlet to the outlet of the valve assembly contacts the valve disc and further wherein a pre-determined water pressure is sufficient to unseat the valve disc and thereby compress air into the upstream water source thereby increasing the density of the water.

2. The valve assembly as described in claim 1 wherein the valve is used in connection with a conventional water meter.

3. The valve assembly as described in claim 1 wherein the valve housing is constructed from a self-lubricating polymer.

4. The valve assembly as described in claim 1 wherein the valve disc is constructed from a self-lubricating polymer.

5. A water metering system for accurately measuring the volume of water used by an individual water consumer over a pre-determined amount of time, the system comprising:

a water supply reservoir for storing a large volume of portable water to be distributed to a plurality of water consumers;

a distribution network interconnected to the water supply reservoir, the distribution network interconnecting the plurality of water consumers, the distribution network having upstream and downstream ends;

a water meter positioned upstream from the individual water consumer, the water meter operable to measure the volume of water used by the water consumer over a pre-determined period of time;

a valve assembly positioned downstream from the water meter, the valve assembly including a valve disc this is biased by a spring and adapted to increase the density of the water passing through the water meter;

the valve assembly including a retainer positioned within an outlet of the valve assembly, the retainer including a series of outlet apertures and opposing shoulders, the opposing shoulders extending perpendicularly from a surface of the retainer, the spring being positioned between one of the opposing shoulders and the valve disc, whereby the spring tension can be changed depending upon which of the pair of opposing shoulders contacts the spring.

6. A water metering system for accurately measuring the volume of water used by an individual water consumer over a pre-determined amount of time, the system comprising:

a water supply reservoir for storing a large volume of portable water to be distributed to a plurality of water consumers;

a distribution network interconnected to the water supply reservoir, the distribution network interconnecting the plurality of water consumers, the distribution network having upstream and downstream ends;

a water meter positioned upstream from the individual water consumer, the water meter operable to measure the volume of water used by the water consumer over a pre-determined period of time;

a valve assembly comprising:

a cylindrical valve housing, the valve housing have a forward valve inlet and a rearward valve outlet, a tapered valve seat positioned adjacent the valve inlet, first and second cylindrical recesses positioned adjacent the valve outlet, the valve housing being constructed from a self-lubricating polymer;

a valve disc positioned within the valve housing, the disc being tapered along its length, wherein the taper of the valve seat matches the taper of the valve disc, the valve disc having a seated orientation wherein it is in contact with the valve seat and an unseated orientation wherein the valve disc is spaced from the valve seat, the valve disc being constructed from a self-lubricating polymer;

a valve shaft having a forward end, a rearward end, and an intermediate extent therebetween, a threaded fastener securing the valve disc to the forward end of the valve shaft;

a retainer secured within the first recess of the valve housing, the retainer including a series of circular apertures to permit the flow of fluid through the valve outlet, the retainer further including a centrally located shoulder having an axial passage, the shoulder having first and second ends extending perpendicularly from a surface of the retainer, with the first end being longer than the second end, the valve shaft slidably positioned within the axial passage;

a locking ring secured within the second recess of the valve housing and operable to lock the retainer within the valve housing;

a coil spring positioned about the intermediate extent of the valve shaft, the coil spring having a first end in contact with the shoulder of the retainer and a second end in contact with the valve disc, wherein the spring tension can be varied by selectively placing either the first or second end of the shoulder in contact with the spring;

whereby water flowing from the inlet to the outlet of the valve assembly contacts the valve disc and further wherein a pre-determined water pressure is sufficient to unseat the valve disc and thereby displacing air bubbles out of the upstream water and increase the density of the water.

* * * * *